(12) United States Patent
Sadri et al.

(10) Patent No.: US 7,720,036 B2
(45) Date of Patent: May 18, 2010

(54) COMMUNICATION WITHIN A WIRELESS NETWORK USING MULTIPLE FREQUENCY BANDS

(75) Inventors: Ali S. Sadri, San Diego, CA (US); Alexander Maltsev, Nizhny Novgorod (RU); Roman Maslennikov, Nizhny Novgorod (RU); Alexey Khoryaev, Dzerzhinsk (RU); Vadim Sergeyev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 562 days.

(21) Appl. No.: 11/394,570

(22) Filed: Mar. 31, 2006

(65) Prior Publication Data

US 2007/0099668 A1    May 3, 2007

Related U.S. Application Data

(60) Provisional application No. 60/730,571, filed on Oct. 26, 2005.

(51) Int. Cl.
*H04W 4/00* (2009.01)
*H04B 1/11* (2006.01)

(52) U.S. Cl. .................. 370/338; 370/401; 375/349
(58) Field of Classification Search .............. None
See application file for complete search history.

(56) References Cited

U.S. PATENT DOCUMENTS

| | | | |
|---|---|---|---|
| 5,790,587 A | 8/1998 | Smith et al. | |
| 6,240,290 B1 | 5/2001 | Willingham et al. | |
| 6,603,958 B1 | 8/2003 | Gao et al. | |
| 6,850,741 B2 | 2/2005 | Lei et al. | |
| 6,885,847 B1 * | 4/2005 | Lumelsky | 455/41.2 |
| 6,954,435 B2 * | 10/2005 | Billhartz et al. | 370/252 |
| 7,119,745 B2 * | 10/2006 | Gaucher et al. | 343/700 MS |
| 7,170,873 B1 * | 1/2007 | Cisar et al. | 370/334 |
| 7,269,198 B1 * | 9/2007 | Elliott et al. | 375/130 |
| 7,349,436 B2 | 3/2008 | Maltsev et al. | |
| 2002/0086708 A1 | 7/2002 | Teo et al. | |
| 2004/0224719 A1 | 11/2004 | Nounin et al. | |
| 2005/0078707 A1 | 4/2005 | Maltsev et al. | |

(Continued)

FOREIGN PATENT DOCUMENTS

EP    0 952 747 A2    10/1999

(Continued)

OTHER PUBLICATIONS

Smulders, Peter, "Exploiting the 60 GHz Band for Local Wireless Multimedia Access: Prospects and Future Directions," IEEE Communications Magazine, Jan. 2002, pp. 140-147.

(Continued)

*Primary Examiner*—Pankaj Kumar
*Assistant Examiner*—Marcus R Smith
(74) *Attorney, Agent, or Firm*—Schwabe, Williamson & Wyatt, P.C.

(57) ABSTRACT

Communication using a first and a second frequency band in a wireless network is described herein. The first frequency band may be associated with a first beamwidth while the second frequency band may be associated with a second beamwidth, the first beamwidth being wider than the second beamwidth.

16 Claims, 6 Drawing Sheets

U.S. PATENT DOCUMENTS

| | | |
|---|---|---|
| 2005/0095996 A1 | 5/2005 | Takano |
| 2005/0249151 A1 | 11/2005 | Takano |
| 2006/0038658 A1 | 2/2006 | Jarvis et al. |
| 2006/0068719 A1* | 3/2006 | Hairapetian .................. 455/69 |
| 2007/0091988 A1 | 4/2007 | Sadri et al. |
| 2007/0232235 A1 | 10/2007 | Li et al. |
| 2007/0238480 A1 | 10/2007 | Li et al. |
| 2007/0280332 A1 | 12/2007 | Srikanteswara et al. |
| 2007/0297365 A1 | 12/2007 | Li et al. |
| 2008/0085738 A1 | 4/2008 | Li et al. |
| 2008/0117865 A1 | 5/2008 | Li et al. |

FOREIGN PATENT DOCUMENTS

| | | |
|---|---|---|
| EP | 1006668 A1 | 6/2000 |
| EP | 1056304 A2 | 11/2000 |
| EP | 1158686 A1 | 11/2001 |
| EP | 1261142 A1 | 11/2002 |
| EP | 1 392 073 A1 | 2/2004 |
| GB | 2317786 A | 4/1998 |
| GB | 2363256 A | 12/2001 |
| WO | WO9509490 | 4/1995 |
| WO | WO9607108 | 3/1996 |
| WO | WO 99/22531 | 5/1999 |
| WO | WO2004054153 A2 | 6/2004 |

OTHER PUBLICATIONS

"International Search report and Written Opinion Received," PCT/US2007/080741, (Feb. 4, 2008), pp. 1-10.

Bandyopadhyay, et al., "An Adapative MAC and Directional Routing Protocol for Ad Hoc Wireless Network Using ESPAR Antenna," ATR Adaptive Communications Research Laboratories, 2000.

Office Action mailed Mar. 5, 2009 for U.S. Appl. No. 11/394,572.

Office Action mailed Sep. 30, 2009 for U.S. Appl. No. 11/394,572.

Office Action mailed Dec. 29, 2008 for U.S. Appl. No. 11/394,600.

Final Office Action mailed Jul. 22, 2009 for U.S. Appl. No. 11/394,600.

Notice of Allowance mailed Sep. 11, 2009 for U.S. Appl. No. 11/394,600.

* cited by examiner

FIG. 1
Prior Art 59- 62 GHz Common unlicensed spectrum

COMMUNICATION WITHIN A WIRELESS NETWORK USING MULTIPLE FREQUENCY BANDS

CROSS REFERENCE TO RELATED APPLICATIONS

The present application claims priority to U.S. Provisional Patent Application No. 60/730,571, filed Oct. 26, 2005, entitled "COMMUNICATION WITHIN A WIRELESS NETWORK USING TWO FREQUENCY BANDS."

TECHNICAL FIELD

Embodiments of the present invention relate to the field of data communication, more specifically, to data communication in a wireless network.

BACKGROUND

In the current state of wireless communication, an increasingly number of communication devices are able to wirelessly communicate with each other. These communication devices include a variety of devices having many different form factors varying from personal computers, mobile or desktop, displays, storage devices, hand-held devices, telephones, and so forth. A number of these communication devices are packaged as "purpose" devices, such as set-top boxes, personal digital assistants ("PDA"), web tablets, pagers, text messengers, game devices, smart appliances, and wireless mobile phones. Such devices may communicate with each other in various different wireless environments such as wireless wide area networks (WWANs), wireless metropolitan area networks (WMANs), wireless local area networks (WLANs), and wireless personal area networks (WPANs), Global System for Mobile Communications (GSM) networks, code division multiple access (CDMA), and so forth.

The growing demand for high throughput applications such as video streaming, real-time collaboration, video content download, and the like, imposes stringent requirements on wireless communications to provide better, faster, and lower cost communications systems. In recent years, unlicensed frequency bands such as 2.4 GHz (Industrial, Scientific, Medical (ISM)) and 5.0 GHz (Universal National Information Infrastructure (UNII)) bands have been utilized for communications up to few hundred Mbps. To achieve these bit rates, relatively complex modulation techniques such as multiple-input/multiple-output (MIMO) orthogonal frequency division multiplexing (OFDM) have been proposed to the Institute of Electrical and Electronics Engineers (IEEE). Due to the popularity of the ISM and UNII bands, these bands are becoming crowded resulting in substantial interference for users of these bands.

Figure 1:
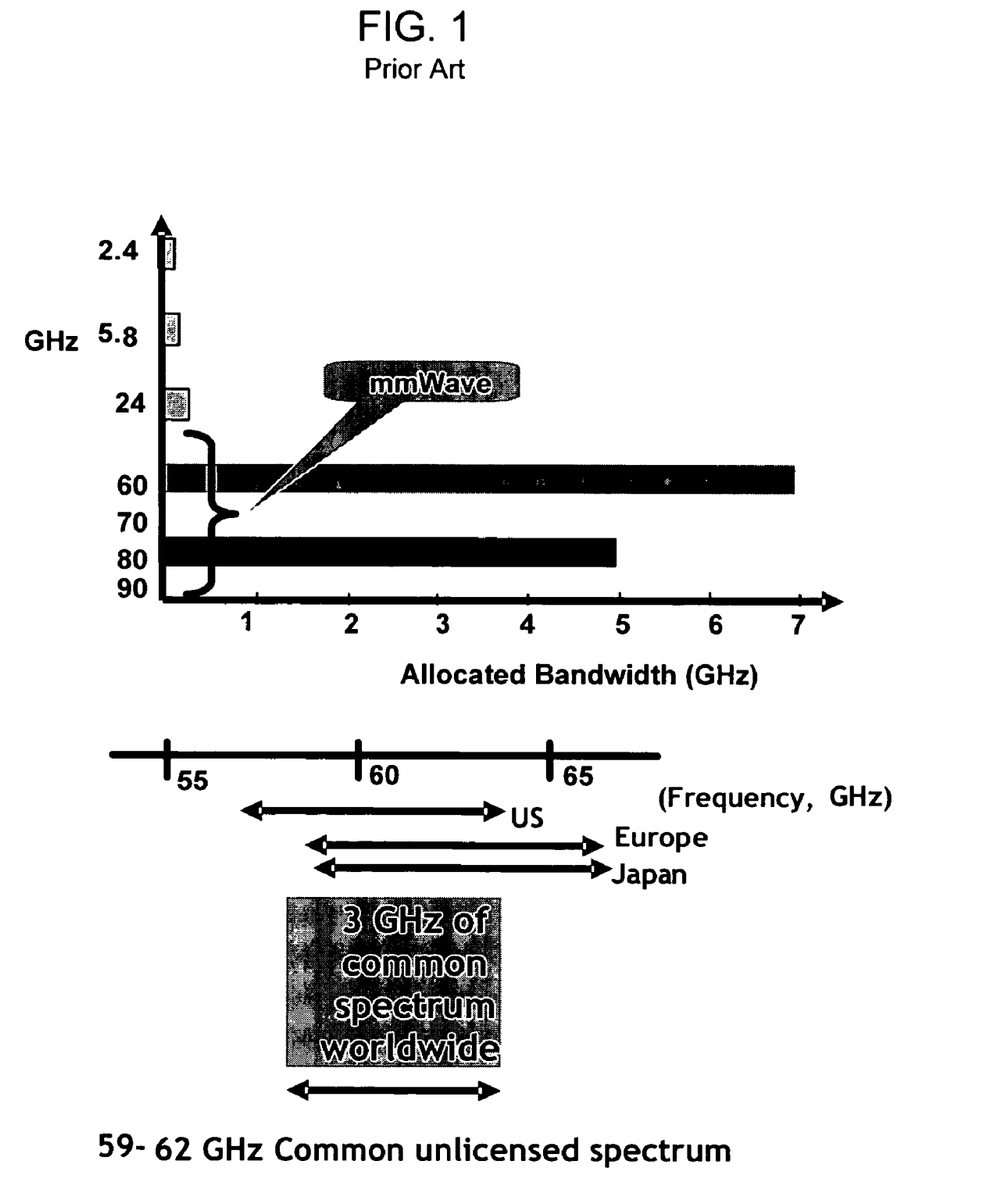
FIG. 1 illustrates currently available unlicensed frequency bands in selected major industrialized countries/regions.

To provide an interference limited Gbps communications, IEEE committees have recently begun looking at communications at higher frequencies such as frequency bands greater than 20 GHz. FIG. 1 shows the currently available unlicensed frequency bands in selected major industrialized countries/regions.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use phrases such as "in one embodiment," or "in various embodiments," which may each refer to one or more of the same or different embodiments. Furthermore, the terms "comprising," "including," "having," and the like, as used with respect to embodiments of the present invention, are synonymous.

According to various embodiments of the invention, methods and systems are provided in which a communication device communicates with other communication devices in a wireless network using a first and a second frequency band. For the embodiments, the first frequency band may be associated with a first beamwidth while the second frequency band may be associated with a second beamwidth, the first beamwidth being greater than the second beamwidth. Although the following description describes using two frequency bands, in alternative embodiments, more than two frequency bands may be employed.

Various approaches may be used in various alternative embodiments in order to communicate via the first frequency band associated with the first beamwidth (herein "first frequency band") and the second frequency band associated with the second beamwidth (herein "second frequency band"). For example, in some embodiments, communication using the first frequency band may be as a result of using a relatively low frequency band such as those bands less than about 20 GHz while communication using the second frequency band may be as a result of using a higher frequency band such as those bands centered above about 20 GHz. Various antenna systems that may include various combinations of antennas and/or multi-element antennas may be employed in various alternative embodiments in order to communicate using the first and the second frequency bands.

As previously described, the first frequency band may be a lower frequency band than the second frequency band. For these embodiments, the first frequency band may be the 2.4 GHz ISM band or the 5.0 GHz UNII band, or some other band less than about 20 GHz while the second frequency band may be a higher frequency band such as a band greater than about 20 GHz, including for example, the 24 GHz band or a band centered in the 59 to 62 GHz spectra. Note that for purposes of this description, the process of communicating using the first lower frequency band may be referred to as out-of-band (OOB) communications and the process of communicating using the second higher frequency band may be referred to as in-band communications. Note further that other frequency bands may also be used as the first and second frequency bands in alternative embodiments and that the demarcation between the first lower frequency band and the second higher frequency band may not be at 20 GHz. In still other alternative embodiments, the first and the second frequency bands may be centered at the same frequencies but may be associated with different beamwidths by using, for example, antennas of different aperture sizes.

In various embodiments, the first frequency band may be used by the communication device to communicate with the other communication devices of the wireless network, OOB control information signals or simply "control information signals" to facilitate data communication using the second frequency band. The data or data signals to be communicated (i.e., transmitted and/or received) using the second frequency band may include various types of data including, for example, data relating to video streaming, realtime and/or non-realtime collaboration, video content download, audio and text content download and/or upload, and so forth.

In order to appreciate various aspects of embodiments of the invention, the characteristics of a frequency band associated with a relative broad beamwidth and the characteristics of a frequency band associated with a relatively narrow beamwidth will now be discussed. This discussion will also describe the characteristics of various types of antennas including, for example, omnidirectional and directional antennas. In addition, a discussion relating to the impact of using a lower as opposed to a higher frequency band will also be provided.

This discussion begins with a brief description of beamwidths. A beamwidth is a spatial characteristic typically associated with antennas or dishes. The beamwidth of an antenna may be determined by the ratio of the antenna aperture size to the wavelength of the signals to be transmitted (or received). That is, the greater the aperture size, the narrower the beamwidth if the wavelengths of the signals to be transmitted (or received) are held constant. Alternatively, the beamwidth may also be made narrower by transmitting (or receiving) signals of shorter wavelengths (i.e., higher frequency) while maintaining a constant aperture size. Thus when an antenna or antennas having similar sized apertures transmit signals of different frequency bands, different beamwidths may result. Note that although the above discussion relates to, among other things, the relationship between aperture size and beamwidth, multi-element antennas may be employed to selectively control the beamwidth of the signals to be transmitted, in which case aperture size may not be relevant as to beamwidth of the signals to be transmitted. That is, antenna systems may be employed that have multi-element antennas that may be adaptively configured to selectively transmit (or receive) signals associated with different beamwidths.

Thus, in order to obtain a relatively broad beamwidth, one approach is to use an antenna having a small aperture, such as an omnidirectional antenna, instead of or in addition to using a relatively low frequency band (e.g., ISM or UNII bands). In contrast, in order to obtain a narrower beamwidth, one approach is to use an antenna having a large aperture, such as a directional antenna, instead of or in addition to using a relatively high frequency band. Of course, alternatively, a single antenna may provide varying beamwidths simply by varying the frequency bands (i.e., either higher or lower frequency bands) of the signals to be transmitted and/or received. In still other alternative approaches, and as previously alluded to, multi-element antennas may be employed to provide frequency bands with varying beamwidths. That is, a single set of multi-element antennas may be adaptively controlled using, for example, special procedures or protocols to provide specific beam directions and specific beam shapes. Thus, a single set of multi-element antennas may be employed to provide multiple frequency bands of varying beamwidths. Note that in the following description, the phrase "antenna" may refer to a single antenna or multi-element antennas.

Figure 2:
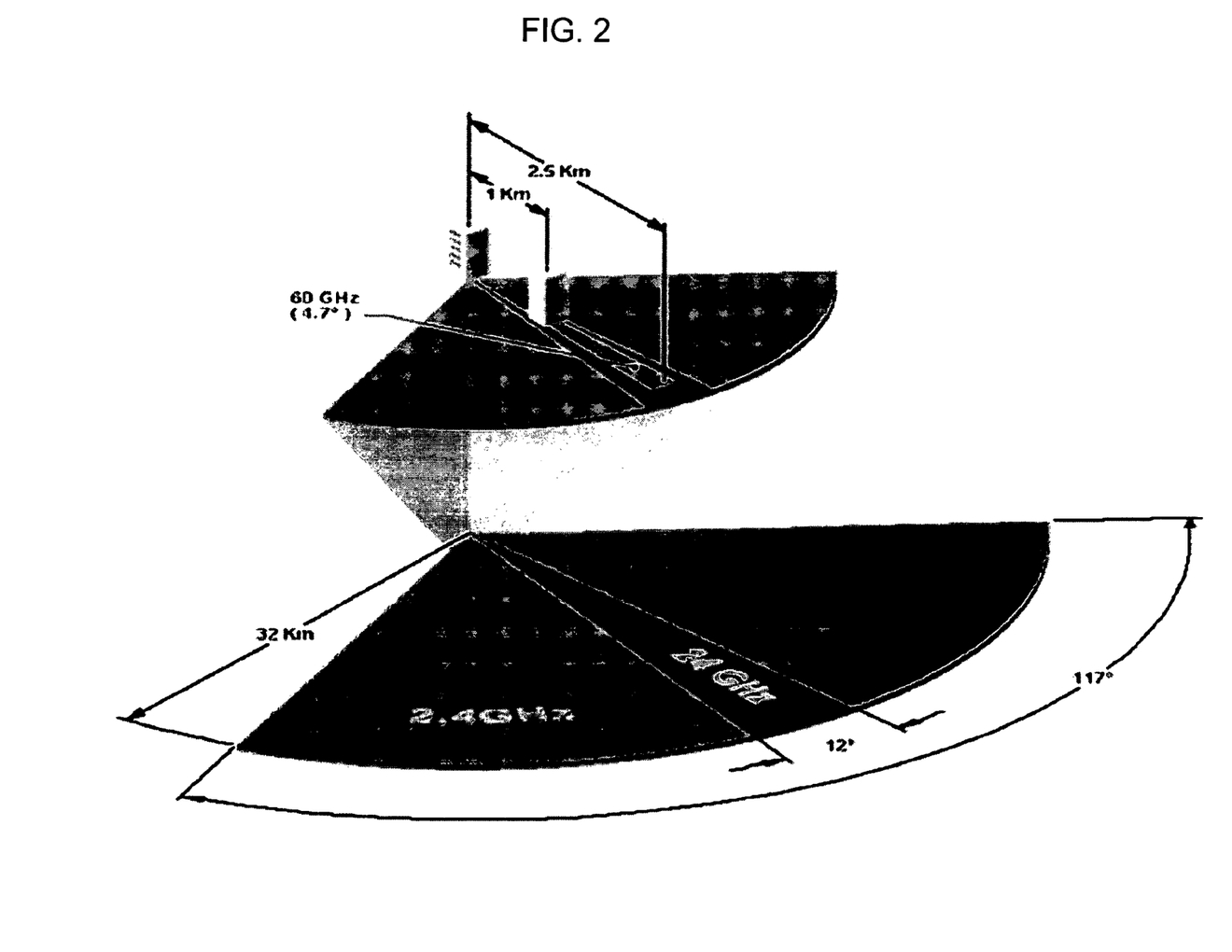
FIG. 2 illustrates exemplary beamwidths of different frequency bands using antennas with about the same aperture size.

Referring now to FIG. 2 comparing the beamwidths of various frequency bands using antennas with about the same aperture size. As previously alluded to, one of the properties of using a lower frequency band such as the 2.4 GHz (ISM) band or the 5.0 GHz (UNII) band instead of a higher frequency band such as an in-band frequency band (e.g., bands greater than 20 GHz) for communicating in a, for example, wireless network is that the lower frequency bands may be associated with a greater beamwidth. Because of the greater beamwidth, signals transmitted via the lower frequency bands will likely reach more devices in the wireless network. However because of the greater beamwidth, the drawback in using a lower frequency band is that because of the broader wedge, there is a greater risk of interference and interception.

In contrast to the lower frequency bands, when higher frequency bands are used for communicating in a wireless network a narrower beamwidth may result as previously described. As a result, there may be less likelihood of interference. In addition to the narrower beamwidth, another property of a higher frequency band is that if a higher frequency band (such as the 24 or the 60 GHz band) is used then there may be an additional attenuation with distance due to, for example, oxygen absorption. That is, and as depicted in FIG. 2, a higher frequency band (e.g., 60 GHz band) may have a smaller beamwidth and a shorter "range" or "reach" than a lower frequency band (e.g., 2.4 or 5.0 GHz bands). Thus, devices operating in the 60 GHz band instead of a lower band such as the 2.4 or 5.0 GHz bands may typically have less interference risk from other remote devices.

Another characteristic of using a higher frequency band for communicating in a wireless network is that the higher frequency band may allow higher signal bandwidth to be used (as more spectra is typically available at higher frequencies) which may consequently allow greater data throughput. At the same time, using the larger bandwidth may decrease the power spectral density of the transmit signal and potentially decrease the reliable communication range due to less signal-to-noise ratio at the receiver side.

The use of higher frequency bands for communicating in a wireless network may mean that a directional antenna rather than an omnidirectional antenna may be used for such communication. The use of such an antenna by itself may offer certain advantages and disadvantages when used to communicate in a wireless network. For example, one advantage of using a directional antenna and the higher frequency band for transmitting signals is that less power may be needed in comparison to using an omnidirectional antenna to achieve the same level of received power. Thus, less efficient (and less expensive) radio frequency (RF) components may be used with the directional antenna, which may be a significant factor in some situations as costs of RF parts may be significantly higher for higher frequency communication.

Of course, there may be certain drawbacks when communicating in a wireless network using a higher frequency band with a directional antenna. For example, adapted or multiple fixed antenna setting that spans 360 degrees may be needed in order to register all of the communication devices in the network. This may be very time-consuming and synchronizing the communication device in the network using, for example, protocols such as carrier sense multiple access and collision avoidance (CSMA/CA) or carrier sense multiple access and collision detection (CSMA/CD), may be very difficult and may not be feasible when a higher frequency band using a directional antenna is employed.

In accordance with various embodiments, the characteristics of frequency bands associated with different beamwidths as described above may be combined and used in a wireless communication network in accordance with various embodiments of the invention as described below.

Figure 3:
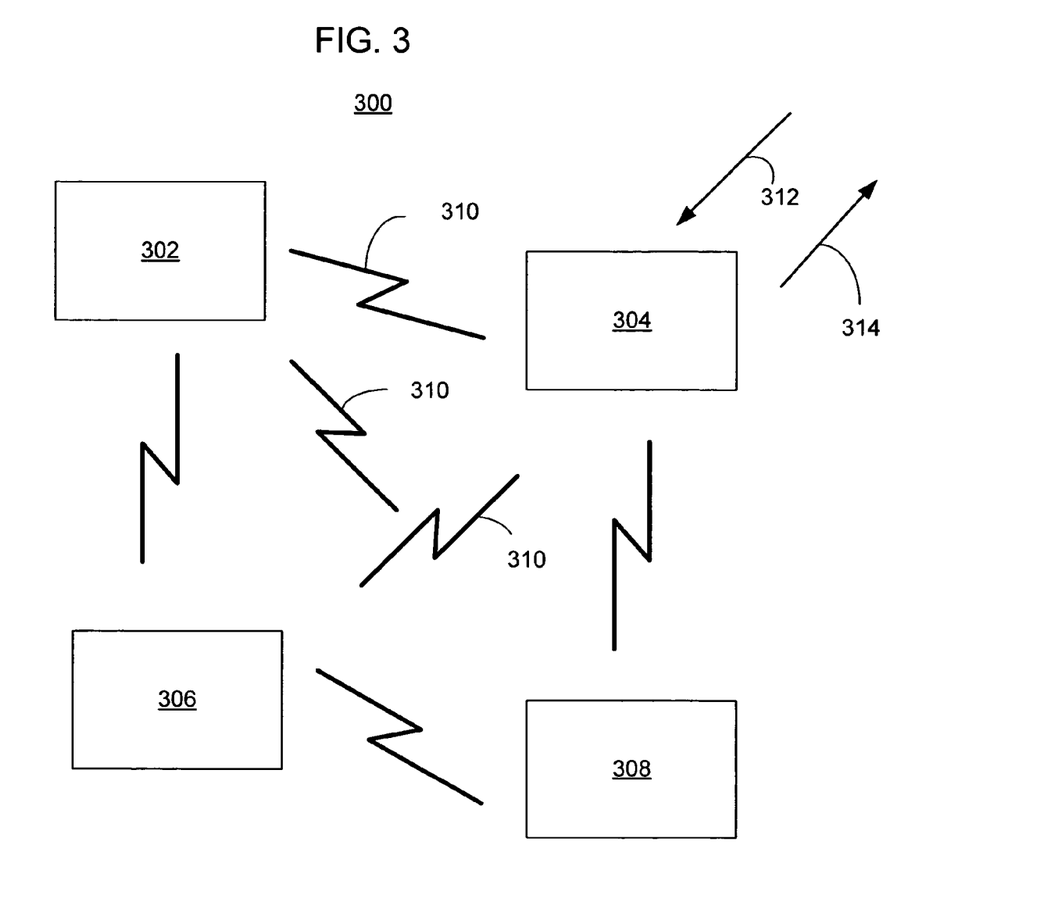
FIG. 3 illustrates a wireless network in accordance with various embodiments.

FIG. 3 depicts a wireless network that includes multiple communication devices (CDs) that are in communication with each other via multiple communication links in accordance with various embodiments. For the embodiments, the network 300 may be WWAN, WMAN, WLAN, WPAN, or other types of wireless networks. The communication devices (CDs) 302-308 may be desktop computers, laptop computers, set-top boxes, personal digital assistants (PDAs), web tablets, pagers, text messengers, game devices, smart appliances, wireless mobile phones or any other types of computing or communication devices. In some embodiments, at least one of the CDs 302-308 may be a master or an access point, while the other CDs may be the client or slave devices. Note that in alternative embodiments, the network 300 may include more or fewer CDs. Each of the CDs 302-308 may communicate with the other CDs of the network 300 via links 310 that may be bidirectional. Communication between the CDs may be in accordance with standards such as 802.11a, 802.11b, and other derivatives of these standards.

For illustrative purposes, embodiments of the present invention will be further described for a WPAN where CD 302 is the access point and CDs 304-308 are the client devices. In an alternative embodiment, the network 300 may be an ad-hoc mesh network where the access point is not needed. Returning to FIG. 3, in some embodiments, at least some of the client CDs 304-308 may arbitrarily and randomly join and/or leave the network 300. Each time a client CD 304-308 enters the network 300, it may authenticate or associate (herein "associate") with the network 300 so that the various client CDs of the network 300 may "know" that the client CD is present in the network 300. In some embodiments, a client CD 304-308 may associate with the network 300 by associating with the access point CD 302. Note that in this illustration, client CD 304 has just entered the network 300 as indicated by reference 312.

The CD 304 upon entering the network 300 may associate itself with the network (e.g., via access point CD 302). In accordance with various embodiments, association with the network 300 may be accomplished using, for example, a first frequency band associated with a relatively broad beamwidth. By transmitting the association signals using a frequency band associated with a relatively broad beamwidth (herein "first beamwidth"), the other CDs 302, 306, and 308 in the network 300 may be more likely to receive the authentication signals (e.g., beacons) from CD 304. In some embodiments, the first frequency band may be a 2.4 GHz (ISM), a 5.0 GHz (UNII), or other bands that may be less than, for example, 20 GHz. Note that access point CD 302 may listen for (i.e., authentication or association) an entering CD 304 through signals transmitted in the first frequency band. After successfully registering or associating with the network 300 (which may be effectuated via any one of a number of association and/or authentication protocols), the components of CD 304 may then "sleep" until it receives data transmission from one of the other CDs in the network or is ready to transmit data to the network 300 (i.e., to one or more of the other CDs in the network 300).

When the client CD 304 is ready to transmit data to one or more of the other CDs in the network 300 (including the access point CD 302), it may initially transmit signals containing control information ("control information signals") using again the first frequency band associated with the first beamwidth. In using the first frequency band associated with the first beamwidth, other CDs 302, 306, and 308 in the network 300 are more likely to "hear" or receive the signals transmitted by the client CD 304. This may provide the opportunity to reduce the interference in the second frequency band because the devices are now aware of CD 304. In various embodiments, the other CDs 302, 306, and 308 may determine the signal parameters of the initial control information signals transmitted by the client CD 304 using the first frequency band. By measuring the signal parameters, the other CDs 302, 306, and 308 may determine the signal strength and the angle of arrival of the initial control information signals. As a result, the other CDs 302, 306, and 308 may be facilitated in determining the distance between the other CDs 302, 306, and 308, and the client CD 304. Further, the location, at least in part of CD 304 relative to the other CDs (i.e., in terms of azimuth and elevation) may be determined by the other CDs 302, 306, and 308 based at least in part on the angle of arrival of the initial signals using the first frequency band. These determinations, in effect, may facilitate further communication using a second frequency band associated with a relatively a narrow beamwidth. That is, among other things, the antenna systems employed by the other CDs 302, 306, and 308, may be properly configured and/or aligned based on the determinations to facilitate further communication using the second frequency band between the CDs 302, 306, and 308, and the client CD 304.

In various embodiments, control information signals may be transmitted using the first frequency band associated with the first beamwidth to at least facilitate establishment of communication between the CD 304 and the other CDs 302, 306, and 308 of the network 300 using a second frequency band that is associated with a second beamwidth that may be a narrower beamwidth than the first beamwidth of the first frequency band. In some embodiments, the control information signals may include data such as medium access control (MAC) mechanism data including data associated with CSMA/CA or CSMA/CD. Again, by using the first frequency band associated with the relatively broad beamwidth for communicating such data, each of the other CDs 302, 306, and 308 is more likely to receive the data. The control information signals may further provide for beam forming parameters such as beam forming coefficients, media content and priority, synchronization parameters, carrier frequency offset (CFO) estimation information, and other types of information that may facilitate communication using the second frequency band. In particular, in some embodiments, the control information signals may be adapted to facilitate beam forming, CFO estimation and/or synchronization of the other CDs 302, 306, and 308. In various embodiments, the CFO estimation and/or synchronization may be accomplished in accordance with the approaches disclosed in co-pending application Ser. No. 11/394,572, entitled "Communication Signaling Using Multiple Frequency Bands in a Wireless Network."

In some embodiments, where one or more of the CDs 302-304 employ antenna systems that include multi-element antennas, the control information signals transmitted using the first frequency band may include signals that facilitate different diversity techniques (e.g., antenna selection and maximum ratio combining), space-time codes (e.g., Alamouti code), and MIMO techniques.

In various embodiments, the second frequency band may be a higher frequency band than the first frequency band. For example, in some embodiments, the second frequency band may be an in-band frequency band (i.e., greater than 20 GHz) such as the 24 GHz band or a frequency band in the 59-62 spectra. The second higher frequency band may be used to transmit and/or receive data at a higher data rate than the first lower frequency band. The higher frequency bands such as those greater than 20 GHz may provide greater bandwidth than lower frequency bands (e.g., 2.4 GHz and 5.0 GHz). In various embodiments, communication using the second frequency band may be in accordance with a particular technique such as OFDM or other modulation techniques. Note that in some alternative embodiments, the first and the second frequency bands may be substantially the same frequency bands but may be associated with different beamwidth by using, for example, antennas of different aperture sizes. Further note that if for some reason the CD 304 is unable to communicate using the second frequency band, then CD 304 may operate in a fall-back operation mode in which communication is entirely via first frequency band at least until the second frequency band is made available. Such a fall-back mode may be needed, for instance, if the transmitting and receiving devices cannot "see" each other using the second frequency band.

When client CD 304 is to leave the network 300 as indicated by reference 314, the client CD 304 may exchange various exit information or parameters with the network 300 (e.g., access point CD 302) prior to exiting the network 300. Upon exiting the network 300, CD 304 may transmit exit information through the first frequency band. The exit information may include the reason code (such as bad signal quality, or just does not want to communicate any more (the application has closed), or was not authorized to enter the network), and so forth.

According to various embodiments, communication (i.e., transmitting and/or receiving) using the first frequency band may be performed via a first antenna or antennas having a first aperture size while communication using the second frequency band may be via a second antenna or antennas having a second aperture size that is narrower than the first aperture size. For these embodiments, the first antenna or antennas may be an omnidirectional antenna or antennas while the second antenna or antennas may be a directional antenna or antennas. In alternative embodiments, a single antenna (which may be multi-element antennas) may be used to communicate via the first or the second frequency bands.

Figure 4A:
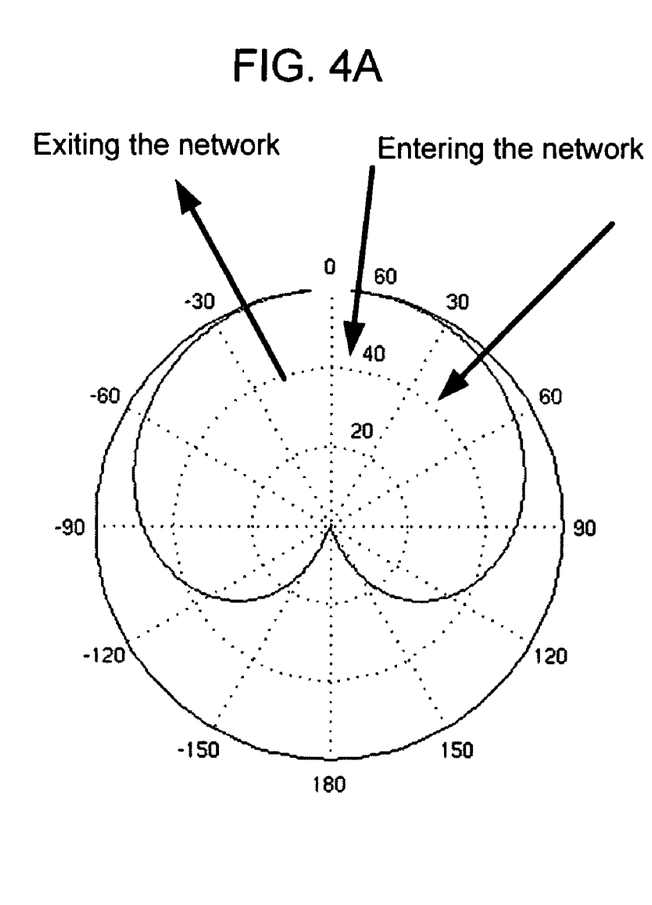
FIGS. 4A and 4B illustrate exemplary wideband and narrowband beams associated with a first lower frequency band and a second higher frequency band.
Figure 4B:
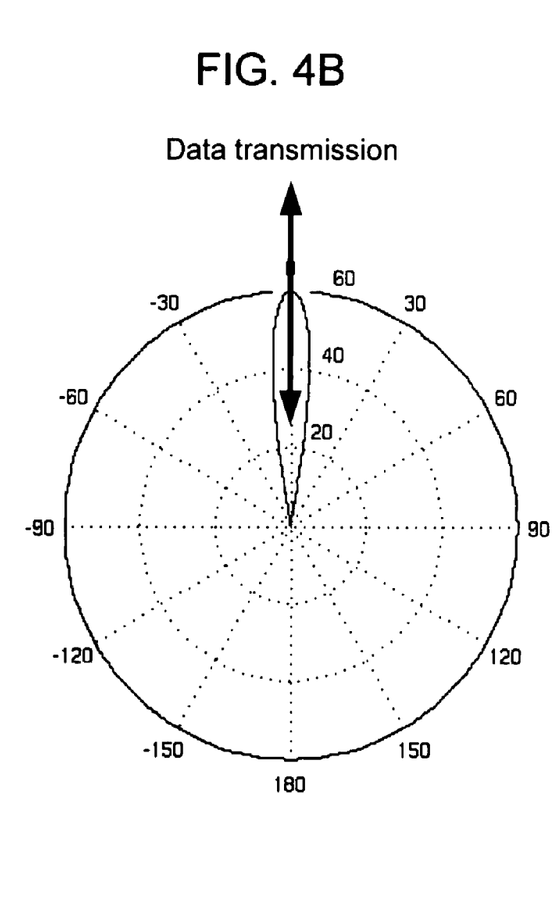

FIGS. 4A and 4B depict exemplary wideband and narrowband beams associated with a first lower frequency band and second higher frequency band, respectively, in accordance with various embodiments. In particular, FIG. 4A shows the wideband beam associated with the first lower frequency band. FIG. 4B, in contrast, shows the narrowband beam of the second higher frequency band.

Figure 5:
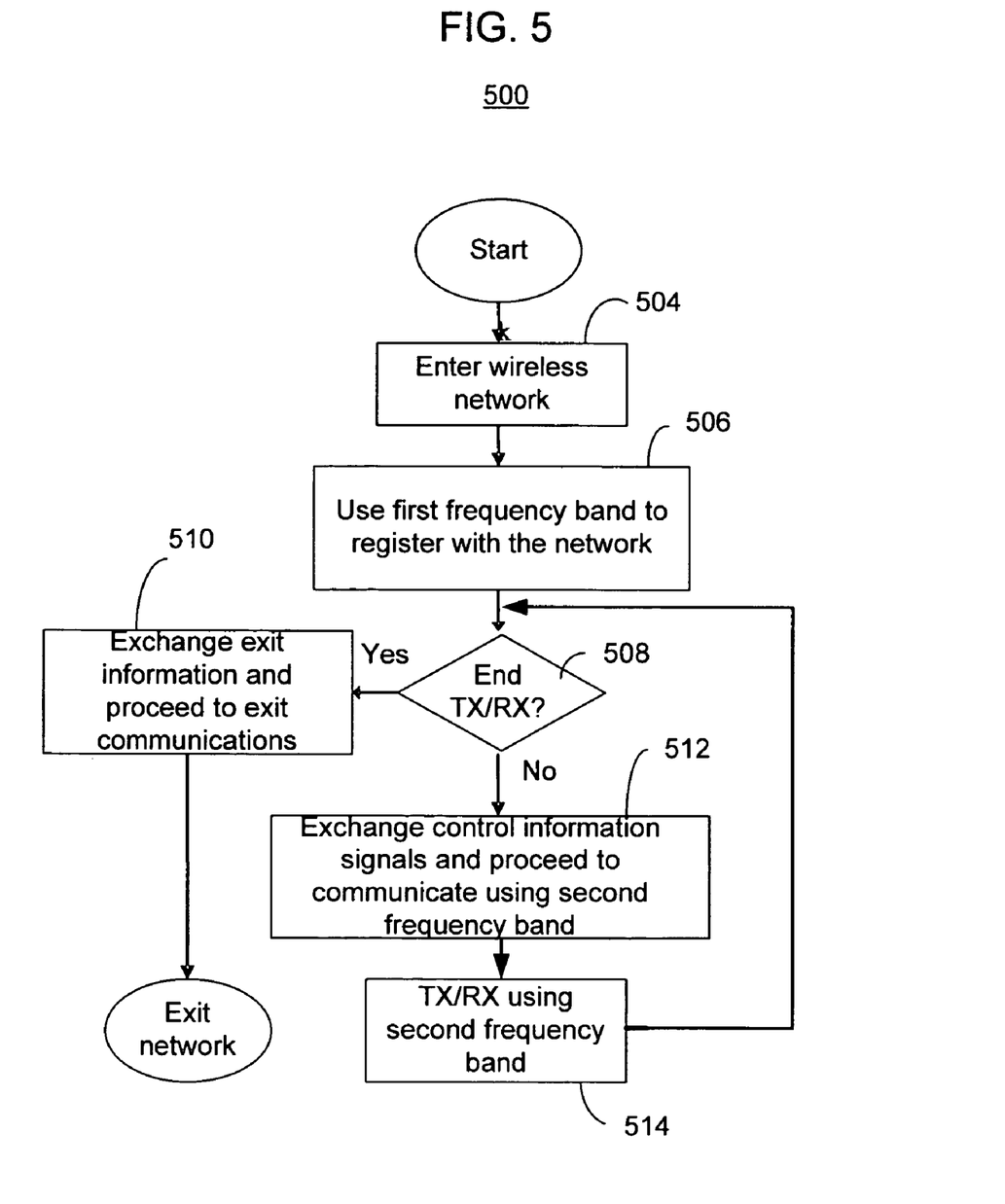
FIG. 5 illustrates a process for communicating by a communication device in a wireless network in accordance with various embodiments.

FIG. 5 depicts a process for communication devices in a wireless network to communicate using a first and a second frequency band in accordance with various embodiments. Again, the first frequency band may be associated with a first beamwidth that is broader than a second beamwidth associated with the second frequency band. In some embodiments, the first frequency band may be a lower frequency band than the second frequency band. The process 500 may be practiced by various communication devices of a wireless network and may start when a communication device enters the network at 504. After entering the network, the communication device may use a first frequency band (e.g., 2.4 GHz ISM band or 5.0 GHz UNII band) associated with a first beamwidth to register with one or more devices of the network at 506. If the communication device has finished communicating (e.g., transmitting and/or receiving) with the network at 508 it may exit the network by exchanging exit information with one or more devices of the network and proceed to exit the network at 510.

On the other hand, if the communication device is not yet finished communicating with one or more communication devices of the network at 508, then the communication device may exchange control information signals with one or more communication devices of the network using the first frequency band, and proceed to communicate with the one or more communication devices of the network using a second frequency band associated with a second beamwidth at 512. In various embodiments, the second beamwidth of the second frequency band may be narrower than the first beamwidth of the first frequency band. The configuration information signals exchanged using the first frequency band may facilitate the establishment of communication between the communication device and the other communication devices of the network using the second frequency band. After the communication device has finished communicating using the second frequency band associated with the second beamwidth at 514, the process 500 may repeat itself by returning to 508.

Figure 6:
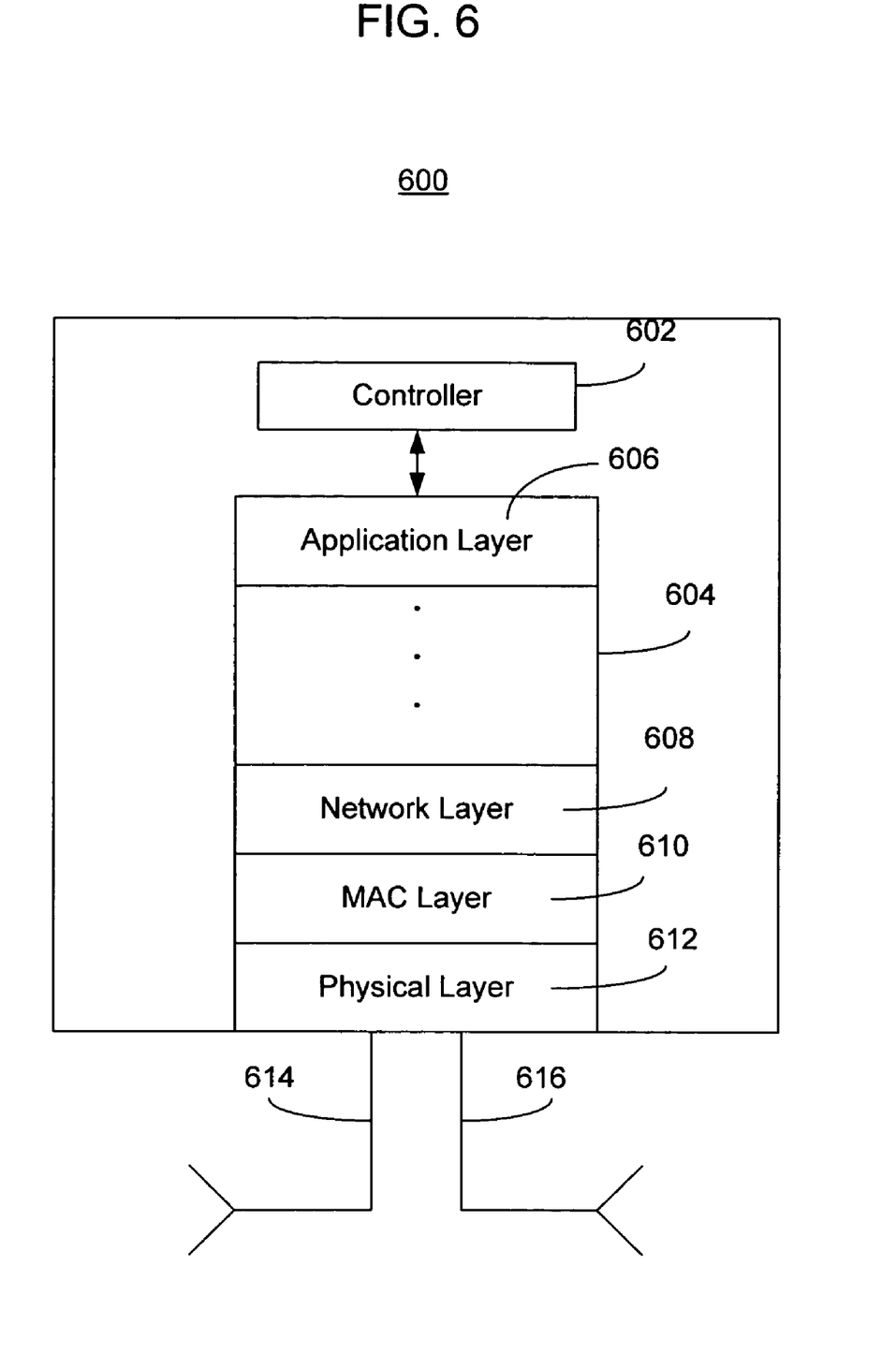
FIG. 6 illustrates a communication device in accordance with various embodiments.

FIG. 6 depicts portions of a communication device 600 that includes a protocol stack 604 having a number of layers including an application layer 606, a network layer 608, a medium access control (MAC) layer 610, and a physical (PHY) layer 612 in accordance with various embodiments. The CD 600 may further include a controller 602 such as a processor or microcontroller to coordinate the activities of various components associated with the various layers of the CD 600. The components of PHY layer 612 may be coupled to two antennas 614 and 616. In some embodiments, one antenna 614 may be an omnidirectional antenna while the other antenna 616 may be a directional antenna. For these embodiments, the omnidirectional antenna may be adapted to transmit and/or receive signals of a first frequency band associated with a first beamwidth while the directional antenna may be adapted to transmit and/or receive signals of a second frequency band associated with a second beamwidth. Again, the first beamwidth being greater than the second beamwidth. In still other embodiments, the PHY layer 612 may be coupled to an antenna system that may employ, for example, one or more multi-element antennas to transmit and/or receive signals using the first and the second frequency bands associated with the first and the second beamwidths, respectively.

Various embodiments of the invention may be practiced by the components of MAC and PHY layers 610 and 612 of the CD 600 (hereinafter, simply MAC and PHY layers). The PHY layer 612 may be adapted to transmit or receive signals as previously described using the first and the second frequency bands. The MAC layer 610, in contrast, may be adapted to selectively employ PHY layer 612 to transmit and/or receive control information and data signals in the first or the second frequency bands, respectively.

The omnidirectional antenna 614 may be used to transmit and/or receive control information signals via the first frequency band to facilitate the establishment of communication between the CD 600 and other CDs of a wireless network using a second frequency band. In contrast, the directional antenna 616 may be used to transmit and/or receive data signals using the second frequency band, the communication using the directional antenna 616 at least in part being established via the configuration information transmitted and/or received using the omnidirectional antenna 614. In order to execute the various functions described above for CD 600 as well as the functions described previously, the CD 600 may include a physical storage medium to store instructions that enables the CD 600 to perform the previously described functions.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method, comprising:
    initiating, by a first communication device upon entering a network, a data transfer with a second communication device of the network, said initiating including transmitting control information signals using a first frequency band, the first frequency band being associated with a first beamwidth, wherein the control information signals include signals providing beam forming parameters, the beam forming parameters comprising a beam forming coefficient to facilitate establishment of communication between the first and second communication devices using a second frequency band associated with a second beamwidth, the first beamwidth being greater than the second beamwidth, wherein the first frequency band is a 2.4 GHz Industrial, Scientific, Medical (ISM) band or a 5.0 GHz Universal Information Infrastructure (UNII) band and the second frequency band is a millimeter wave band; and
    transmitting or receiving data signals by the first communication device to or from the second communication device using the second frequency band, the transmitting or receiving of the data signals to be facilitated at least in part by the control information signals transmitted using the first frequency band associated with the first beamwidth.

2. The method of claim 1, wherein said transmitting control information signals using a first frequency band, comprises transmitting by the first communication device, control information signals using an omnidirectional antenna, and said transmitting or receiving data signals by the first communication device to or from the second communication device using the second frequency band comprises transmitting or receiving data signals using a directional antenna.

3. The method of claim 1, wherein said transmitting or receiving data signals by the first communication device to or from the second communication device using the second frequency band comprises transmitting or receiving data signals using a second frequency band in accordance with orthogonal frequency division multiplexing (OFDM).

4. The method of claim 1, wherein said transmitting control information signals using a first frequency band, comprises transmitting by the first communication device, control information signals to facilitate the second communication device in determining the location, at least in part, of the first communication device.

5. The method of claim 1, wherein said transmitting control information signals using a first frequency band, comprises transmitting by the first communication device, control information signals including medium access mechanism data signals.

6. The method of claim 1, further comprising associating the second communication device with the network using the first frequency band and/or exiting the network by the second communication device using the first frequency band.

7. The method of claim 1, further comprising transmitting or receiving data signals by the first communication device to or from the second communication device using the first frequency band if the second frequency band is unavailable for communication.

8. An article of manufacture, comprising:
    a physical storage medium;
    a plurality of executable instructions stored in the physical storage medium to program a device to enable the device to:
    receive control information signals using a first frequency band during initiation of a data transfer by an other device upon entering a network, the first frequency band being associated with a first beamwidth, wherein the control information signals include signals providing beam forming parameters, the beam forming parameters comprising a beam forming coefficient to facilitate establishment of communication between the device and the other device of a wireless network using a second frequency band associated with a second beamwidth, the first beamwidth being greater than the second beamwidth; and
    perform transmit or receive data signals by the device to or from the other device using the second frequency band, the transmit or receive of data signals to be facilitated at least in part by the control information signals transmitted using the first frequency band associated with the first beamwidth, wherein the first frequency band is a 2.4 GHz Industrial, Scientific, Medical (ISM) band or a 5.0 GHz Universal Information Infrastructure (UNII) band and the second frequency band is a millimeter wave band.

9. The article of claim 8, wherein said instructions enable said device to perform said receive of control information signals using an omnidirectional antenna and to perform said transmit or receive of data signals to or from the other device using a directional antenna.

10. The article of claim 8, wherein said instructions enable said device to perform said receive of control information signals to facilitate the device in determining the location, at least in part, of the other device.

11. An apparatus, comprising:
    a physical (PHY) layer to transmit or receive signals to or from at least one other device of a wireless network using a first and a second frequency band associated with a first and a second beamwidth, respectively, the first beamwidth being greater than the second beamwidth, wherein the first frequency band is a 2.4 GHz Industrial, Scientific, Medical (ISM) band or a 5.0 GHz Universal Information Infrastructure (UNII) band and the second frequency band is a millimeter wave band; and a medium access control (MAC) layer coupled to the PHY layer to selectively employ the PHY layer to transmit or receive control information signals during initiation of a data transfer upon entering a network using the first frequency band, and transmit or receive data signals using the second frequency band, wherein the control information signals include signals providing beam forming parameters, the beam forming parameters comprising a beam forming coefficient.

12. The apparatus of claim 11, further comprising a first and a second antenna coupled to the PHY layer, the first antenna to be employed by the PHY layer to transmit or receive signals in the first frequency band, and the second antenna to be employed by the PHY layer to transmit or receive signals in the second frequency band.

13. The apparatus of claim 11, wherein said PHY layer to transmit or receive the data signals in the second frequency band in accordance with orthogonal frequency division multiplexing (OFDM).

14. A system, comprising:

a physical (PHY) layer to transmit or receive signals to or from at least one other device of a wireless network using a first and a second frequency band associated with a first and a second beamwidth, respectively, the first beamwidth being greater than the second beamwidth, wherein the first frequency band is a 2.4 GHz Industrial, Scientific, Medical (ISM) band or a 5.0 GHz Universal Information Infrastructure (UNII) band and the second frequency band is a millimeter wave band;

a medium access control (MAC) layer coupled to the PHY layer to selectively employ the PHY layer to transmit or receive control information signals during initiation of a data transfer upon entering a network using the first frequency band, and transmit or receive data signals using the second frequency band, wherein the control information signals include signals providing beam forming parameters, the beam forming parameters comprising a beam forming coefficient; and an omnidirectional antenna coupled to the PHY layer to transmit or receive signals through the first frequency band.

15. The system of claim 14, further comprising a second antenna coupled to the PHY layer to be employed to transmit or receive signals through the second frequency band.

16. The system of claim 14, wherein said PHY layer to transmit or receive signals in accordance with orthogonal frequency division multiplexing (OFDM).

* * * * *